United States Patent
Hayakawa

(10) Patent No.: US 7,676,093 B2
(45) Date of Patent: Mar. 9, 2010

(54) IMAGE READING AND PROCESSING METHOD AND STORAGE MEDIUM STORING A COMPUTER PROGRAM THEREFOR THAT DETECTS A CONTOUR OF AN IMAGE READ AT A HIGHER RESOLUTION

(75) Inventor: Mizuki Hayakawa, Kashiwa (JP)

(73) Assignee: Canon Kabushiki Kaisha (JP)

( * ) Notice: Subject to any disclaimer, the term of this patent is extended or adjusted under 35 U.S.C. 154(b) by 1159 days.

(21) Appl. No.: 10/954,993

(22) Filed: Sep. 30, 2004

(65) Prior Publication Data

US 2005/0111057 A1     May 26, 2005

(30) Foreign Application Priority Data

Oct. 2, 2003     (JP)     ............................. 2003-344735

(51) Int. Cl.
*G06K 9/48*     (2006.01)
(52) U.S. Cl. ...................................................... 382/199
(58) Field of Classification Search ........................ None
See application file for complete search history.

(56) References Cited

U.S. PATENT DOCUMENTS 6,049,636 A * 4/2000 Yang ........................... 382/289
6,970,607 B2 * 11/2005 Jia et al. ...................... 382/296
7,030,845 B2 * 4/2006 Maa ............................ 345/88

FOREIGN PATENT DOCUMENTS

JP      10-336428       12/1998
JP      11-8755 A       1/1999

* cited by examiner

*Primary Examiner*—Vikkram Bali
*Assistant Examiner*—Elisa M Rice
(74) *Attorney, Agent, or Firm*—Rossi, Kimms & McDowell LLP

(57) ABSTRACT

An image reading and processing method which is capable of automatically obtaining image data with high resolution along the proper contour of an original. First image reading is carried out on the original at a first resolution to obtain image data. The contour area of an image of the original 7 is detected based on the image data obtained by the image reading. Second image reading is carried out on the original at a second resolution higher than the first resolution, over an area 51 having outer edges thereof shared by the contour area 41, to obtain image data. The contour of the image of the original is detected in the contour area 41, based on the image data obtained by the second image reading. Image data of an image portion inside the detected contour of the image of the original is extracted from the image data obtained by the second reading.

2 Claims, 4 Drawing Sheets

IMAGE READING AND PROCESSING METHOD AND STORAGE MEDIUM STORING A COMPUTER PROGRAM THEREFOR THAT DETECTS A CONTOUR OF AN IMAGE READ AT A HIGHER RESOLUTION

BACKGROUND OF THE INVENTION

1. Field of the Invention

The present invention relates to an image reading and processing method, a program for implementing the method, and a storage medium storing the program, and more particularly, to an image reading and processing method which performs a pre-scan at low resolution to determine an area where a main scan is to be carried out, and then carries out the main scan in the determined area, as well as a program for causing a computer to execute the program, and a storage medium storing the program.

2. Description of the Related Art

Generally, in an image reading apparatus which inputs an image by reading the image which exists on an original such as paper or a film, pre-scan reading of the image is first carried out at low resolution. A user determines an area to be scanned, based on the obtained image with low resolution, and then image reading is carried out at high resolution in the determined area.

Conventionally, there has been known a technique where an image of an original, such as a photograph or a film, placed on an original platen glass is pre-scanned at low resolution, and based on the obtained image with low resolution, the contour of the image of the original is extracted, to thereby automatically determine an area on the original platen glass on which the original is placed (refer to U.S. Pat. No. 6,049,636, Japanese Laid-Open Patent Publication (Kokai) No. H11-8755, and Japanese Laid-Open Patent Publication (Kokai) No. H10-336428, for example). When this technique is used, even if the user does not determine the area to be scanned, the area where image reading is to be carried out at high resolution can be automatically determined.

However, according to the above-mentioned conventional technique of automatically determining the area of the image of the original, the accuracy of the coordinates which express the area depends on the resolution of the image, and therefore the accuracy of the position of the area automatically determined based on the image with low resolution is not sufficient for the image reading at high resolution. In other words, when the coordinates expressing the area are thus automatically determined and an image is obtained by main scan at high resolution in the area, there arises a problem that a part of the image is cut-off or conversely an excess image is included.

SUMMARY OF THE INVENTION

It is an object of the present invention to provide an image reading and processing method which is capable of automatically obtaining image data with high resolution along the proper contour of an original, a program for implementing the method, and a storage medium storing the program.

To attain the above object, in a first aspect of the present invention, there is provided an image reading and processing method comprising a first image reading step of carrying out image reading on an original at a first resolution to obtain image data, a first detecting step of detecting a contour area of an image of the original based on the image data obtained in the first image reading step, a second image reading step of carrying out image reading on the original at a second resolution higher than the first resolution, over an area having outer edges thereof shared by the contour area detected in the first detecting step, to obtain image data, a second detecting step of detecting a contour of the image of the original in the contour area, based on the image data obtained in the second image reading step, and an extracting step of extracting image data of an image portion inside the contour of the image of the original detected in the second detecting step, from the image data obtained in the second image reading step.

Preferably, the contour area is an area which is defined by outer edges and inner edges each having vertical and horizontal sizes thereof determined by the total sizes of respective predetermined numbers of pixels, in the image data at the first resolution obtained in the first image reading step.

To attain the above object, in a second aspect of the present invention, there is a computer-readable program for causing a computer to execute an image reading and processing method, comprising a first image reading module for carrying out image reading on an original at a first resolution to obtain image data, a first detecting step module for detecting a contour area of an image of the original based on the image data obtained by the first image reading module, a second image reading module for carrying out image reading on the original at a second resolution higher than the first resolution, over an area having outer edges thereof shared by the contour area detected by the first detecting module, to obtain image data, a second detecting module for detecting a contour of the image of the original in the contour area, based on the image data obtained by the second image reading module, and an extracting module for extracting image data of an image portion inside the contour of the image of the original detected by the second detecting module, from the image data obtained by the second image reading module.

Preferably, the contour area is an area which is defined by outer edges and inner edges each having vertical and horizontal sizes thereof determined by the total sizes of respective predetermined numbers of pixels, in the image data at the first resolution obtained by the first image reading module.

To attain the above object, in a third aspect of the present invention, there is a computer-readable storage medium storing a program for causing a computer to execute an image reading and processing method, the program comprising a first image reading module for carrying out image reading on an original at a first resolution to obtain image data, a first detecting module for detecting a contour area of an image of the original based on the image data obtained by the first image reading module, a second image reading module for carrying out image reading on the original at a second resolution higher than the first resolution, over an area having outer edges thereof shared by the contour area detected by the first detecting module, to obtain image data, a second detecting module for detecting a contour of the image of the original in the contour area, based on the image data obtained by the second image reading module, and an extracting module for extracting image data of an image portion inside the contour of the image of the original detected by the second detecting module, from the image data obtained by the second image reading module.

Preferably, the contour area is an area which is defined by outer edges and inner edges each having vertical and horizontal sizes thereof determined by the total sizes of respective predetermined numbers of pixels, in the image data at the first resolution obtained by the first image reading module.

According to the present invention, the contour area of an image of the original is detected based on image data read at low resolution, and image reading at high resolution is carried out over an area having the outer edges thereof shared by the detected contour area. Based on the image data obtained at high resolution, the contour of the image of the original is detected in the contour area, and image data of an image inside the detected contour of the image of the original is extracted from the image data obtained at high resolution. As a result, it is possible to automatically obtain image data with high resolution along the proper contour of the image of the original.

Moreover, since the contour of the image of the original is detected in the contour area based on the image data obtained at high resolution, the processing time is compared with the detection in the whole area.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the accompanying drawings showing a preferred embodiment thereof.

Figure 1:
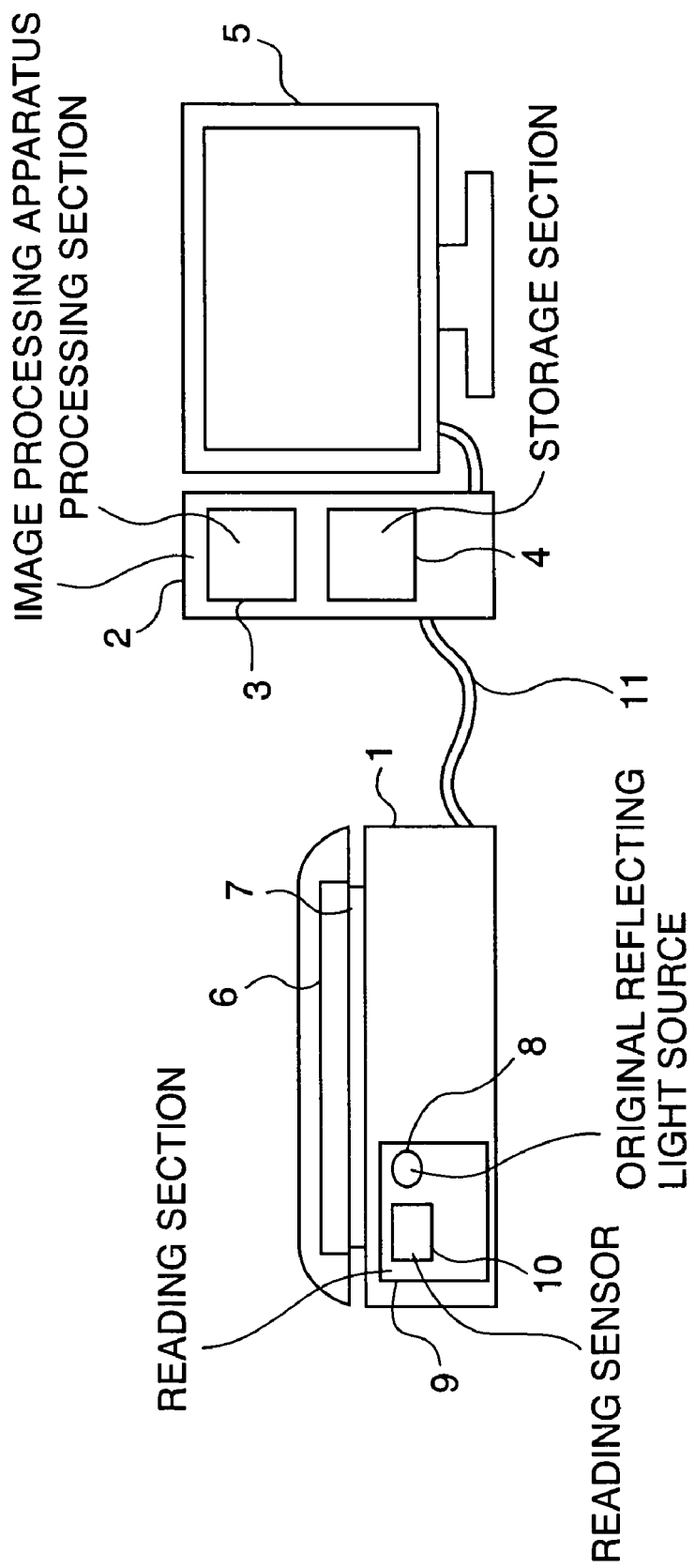
FIG. 1 is a diagram showing the configuration of an image reading apparatus and an image processing apparatus connected to the image reading apparatus, to which is applied an image reading and processing method according to an embodiment of the present invention.

FIG. 1 is a diagram showing the configuration of an image reading apparatus and an image processing apparatus connected to the image reading apparatus, to which is applied an image reading and processing method according to an embodiment of the present invention.

In FIG. 1, an image reading apparatus 1 is comprised of a reading section 9, which includes a reading sensor 10 and an original reflecting light source 8, and an original transmitting light source 6. When an original 7 is composed of a non-transparent sheet, upon designation of a non-transparent sheet through an operating input section, not shown, by a user, the original reflecting light source 8 is turned on to illuminate the original 7 from below, and reflected light from the original 7 is directed to the reading sensor 10. On the other hand, when the original 7 is composed of a transparent sheet, upon designation of a transparent sheet through the operating input section, the original transmitting light source 6 is turned on to illuminate the original 7 from above, and light transmitted through the original 7 is directed to the reading sensor 10.

The whole area of the original 7 can be read by the reading section 9 moving left to right as viewed in FIG. 1. It is possible to keep the reading sensor 10 from carrying out its image reading operation over a predetermined area while the reading section 9 is moving, whereby, when the reading section 9 is moved to a specified position, the reading sensor 10 can be actuated to read a part of the area of the original 7. Also, the movement speed of the reading section 9 and/or the operation of the reading sensor 10 can be controlled so as to perform image reading at a number of different resolutions.

Irrespective of whether the user designates a non-transparent sheet or a transparent sheet, image data read by the reading sensor 10 is transferred to the image processing apparatus 2 via an interface 11 and stored in a storage section 4. The storage section 4 is comprised of a storage medium, such as a hard disk or a semiconductor memory. A processing section 3 carries out image processing of the image data stored in the storage section 4, and carries out processes such as extracting the contour area of a photo or a film. A display 5 is implemented by a CRT, a LCD, or the like, and displays an image based on image data stored in the storage section 4 or image data obtained through image processing by the processing section 3.

Figure 2:
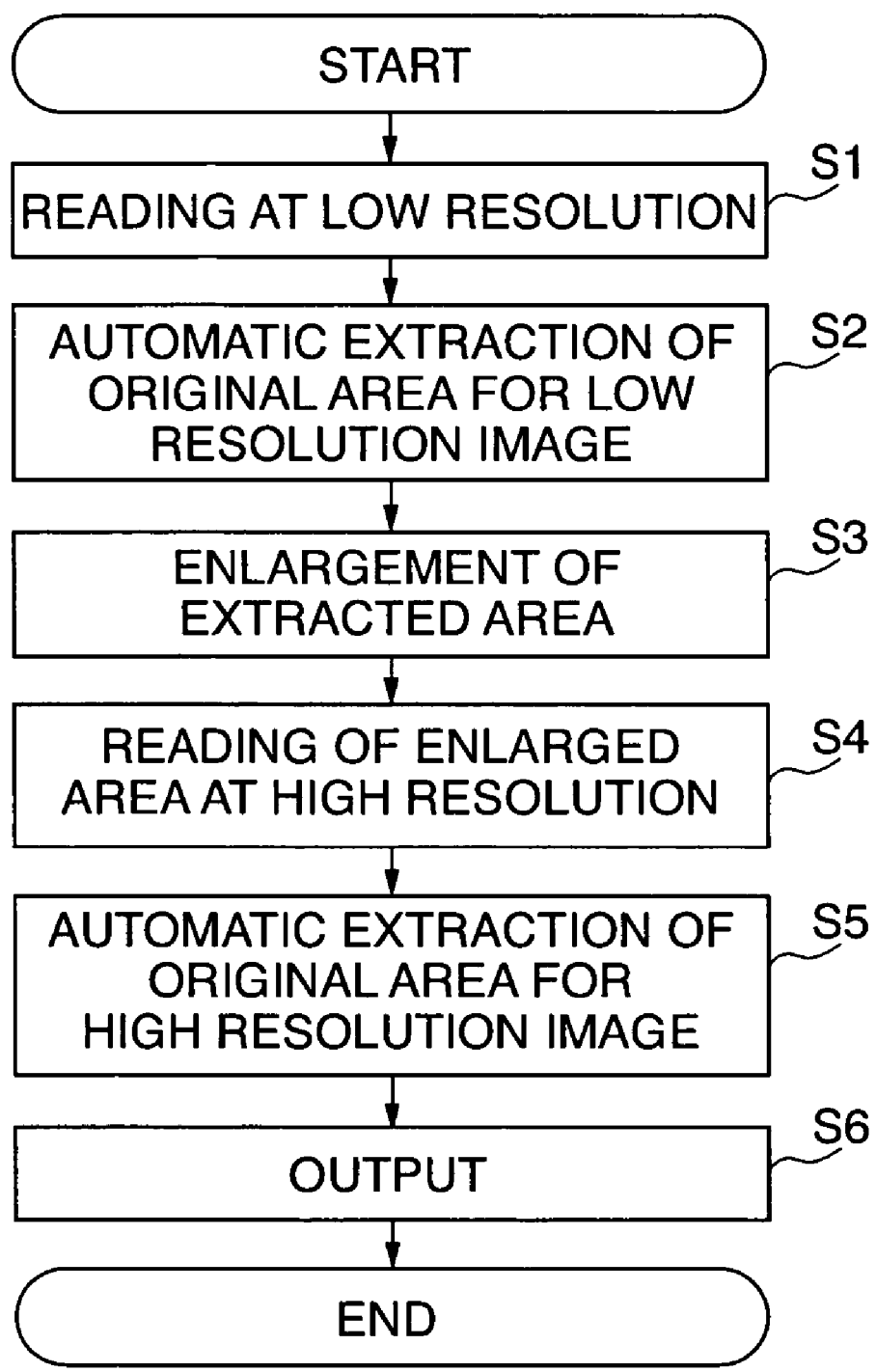
FIG. 2 is a flowchart showing the steps of an image reading process carried out by the image reading apparatus and the image processing apparatus.
Figure 3:
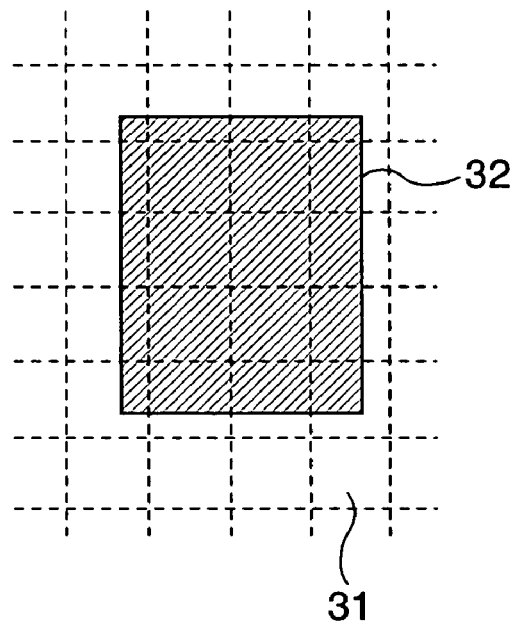
FIG. 3 is a first diagram showing the relationship between the area of an original, pixel size, and a reading area.
Figure 4:
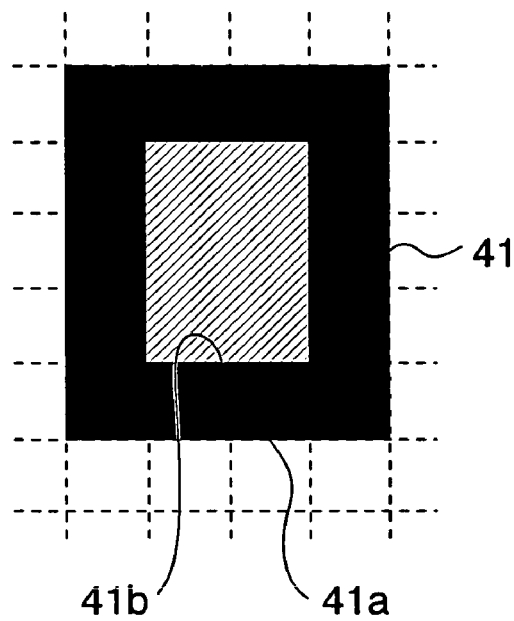
FIG. 4 is a second diagram showing the relationship between the area of the original, pixel size, and the reading area.
Figure 5:
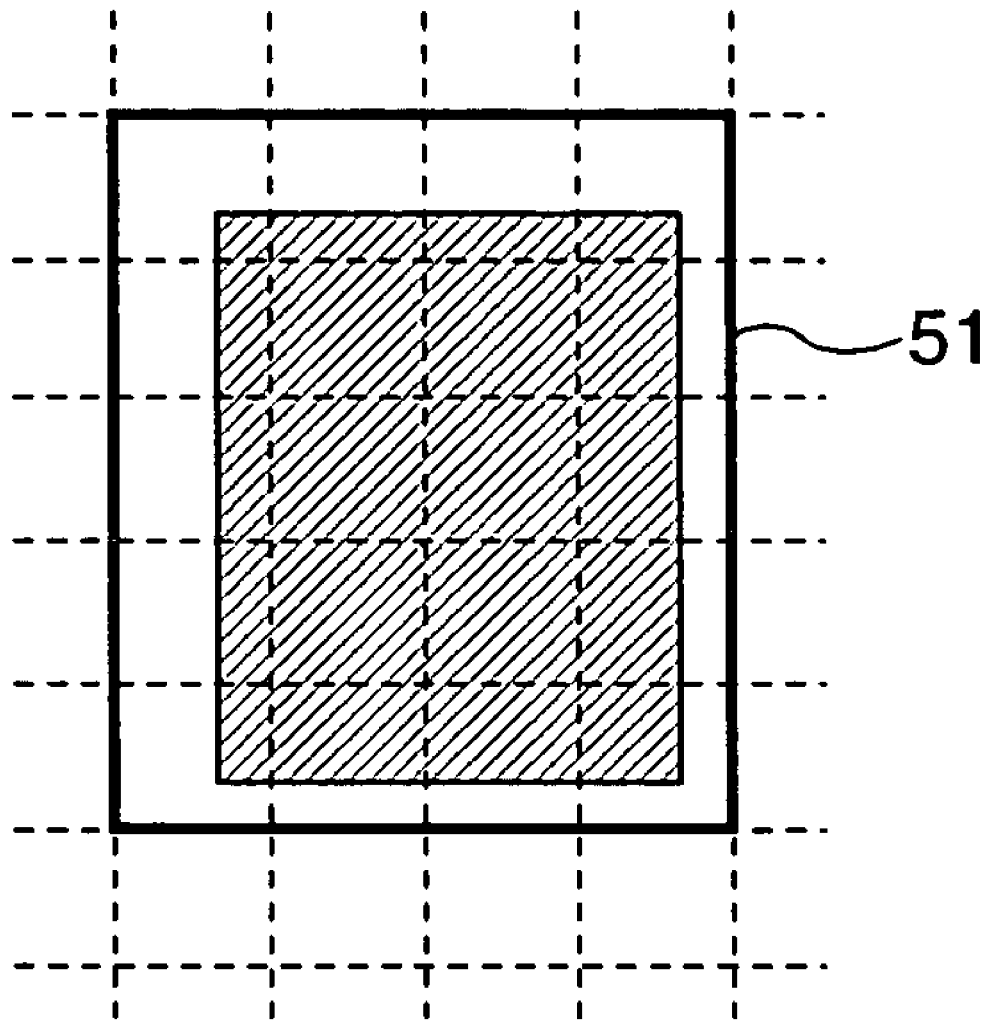
FIG. 5 is a third diagram showing the relationship between the area of the original, pixel size, and the reading area.

FIG. 2 is a flowchart showing an image reading process carried out by the image reading apparatus 1 and an image processing apparatus 2. FIGS. 3 to 5 are first to third diagrams showing the relationship between the area of an original, pixel size, and a reading area. The image reading process will now be described with reference to the flowchart of FIG. 2 as well as to FIGS. 3 to 5 where necessary.

In a step S1 in FIG. 2, image reading (pre-scan) is carried out on the original 7 by the image reading apparatus 1. This pre-scan is performed over the entire readable area of the original 7 by the image reading apparatus 1.

In a step S2, based on the image data obtained by the image reading carried out in the step S1, the processing section 3 detects the contour of the area of the original image. This will be explained by referring to FIGS. 3 and 4.

That is, in FIG. 3, the vertical and horizontal dashed lines indicate the boundaries between pixels 31 in the image obtained by the image reading at low resolution. An area 32 shows the actual size of the original. The contours of this area 32 lie between boundaries between pixels. The contour of the area of the original image is detected by the processing section 3 based on the image data read at low resolution, as a contour area 41 which is defined by outer edges 41a and inner edges 41b each having its vertical and horizontal sizes determined by the total sizes of respective predetermined numbers of pixels 31.

In a step S3, an area for which reading is to be carried out at high resolution is determined based on the contour area 41 detected in the step S2. That is, an area 51 (FIG. 5) having its outer edges shared by the contour area 41 is determined.

In a step S4, the image reading apparatus carries out image reading at high resolution over the area 51 determined in the step S3.

In a step S5, the processing section 3 detects the contour of the area 32 in the contour area 41 based on image data with high resolution obtained in the step S4. At this time, the processing section 3 carries out a detection process only using the contour area 41. Therefore, processing time is reduced compared with the detection using the area 51.

In a step S6, only the image data with high resolution in the area 32 inside the contour detected in the step 5 is extracted from the image data with high resolution obtained in the step 4, and then stored in the storage section 4. At the same time, the extracted image data with high resolution within the area 32 is displayed on the display 5.

As described above, according to the present embodiment, first, image reading is carried out at low resolution to detect the contour area of the original. Then, reading at high resolution is carried out over an area having its outer edges shared by the detected contour area. The contour of the original image in the above-mentioned contour area is detected based on the image data with high resolution obtained. Only the image data of an image portion inside the contour of the original is extracted.

As a result, an extraction of only the image data located inside the proper contour of the original image can be quickly performed. In the case where image reading is started with reading at high resolution to detect the contour of the original image, a large capacity is required of the storage section 4 to store the read image data and the processing section 3 takes a long period of time to complete the processing. According to the present embodiment, however, a less capacity is required of the storage section 4 and the processing section 3 can complete the processing within a reduced period of time.

In the above-described embodiment, alternatively, it may be configured such that an image as shown in FIG. 4, obtained based on the contour area 41 obtained in the step S2 in FIG. 2 and the low resolution image data read in the step S1, is displayed on the display 5. The user who sees the displayed image may then decide whether or not to perform image reading at high resolution.

It is to be understood that the object of the present invention may also be accomplished by supplying a system or an apparatus with a storage medium in which a program code of software which realizes the functions of the above described embodiment is stored, and causing a computer (or CPU or MPU or the like) of the system or apparatus to read out and execute the program code stored in the storage medium.

In this case, the program code itself read out from the storage medium realizes the new functions of the present invention described above, and hence the program and the storage medium in which the program code is stored constitute the present invention.

Examples of the storage medium for supplying the program code include a floppy (registered trademark) disk, a hard disk, an optical disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network from another computer, a database or the like, not shown, connected to the Internet, a commercial network, a local area network, or the like.

Further, the functions of the above-described embodiment may be accomplished not only by executing a program code read out by a computer, but also by causing an operating system (OS) or the like which operate on the computer to perform a part or all of the actual operations based on instructions of the program code.

Further, it is to be understood that the functions of the above-described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2003-344735 filed Oct. 2, 2003, which is hereby incorporated by reference herein.

What is claimed is:

1. An image reading and processing method carried out with an image reading apparatus having an image reading area on which an original is placed and a reading section, and an image processing apparatus having an image processing section and a storage section, the method comprising:

a first image reading step of reading an image over the entire image reading area including a region on which the original is placed at a first resolution to obtain first image data;

a first detecting step of detecting a contour area of an image of the original based on the first image data obtained in said first image reading step;

a first extracting step of extracting a first area from the contour area detected in said first detecting step, wherein outer edges of the first area coincide with outer edges of the contour area detected in said first detecting step, and sandwiching the outer edges and inner edges positioned at inside of the outer edges by the width of a pixel at the first resolution;

a second image reading step of reading the image of the original at a second resolution higher than the first resolution, over only a second area having outer edges thereof shared by the outer edges of the first area extracted in said first extracting step, to obtain second image data;

a second detecting step of detecting a contour of the image of the original from the area overlapping the first area with the second area obtained in said second image reading step;

a second extracting step of extracting third image data of an image portion inside the contour of the image of the original detected in said second detecting step, from the second image data obtained in said second image reading step; and a storing step of storing the extracted third image data in the storage section, wherein the first and second image reading steps are carried out by the image reading section, and wherein the first detecting step, the first extracting step, the second detecting step, the second extracting step, and the storing steps are carried out by the image processing section.

2. A computer-readable storage medium storing a computer program executable by a computer for controlling an image reading and processing, the computer program comprising:

a first image reading code for reading an image over an entire image reading area including a region on which an original is placed of an image reading apparatus at a first resolution to obtain first image data;

a first detecting code for detecting a contour area of an image of the original based on the first image data obtained by said first image reading code;

a first extracting code for extracting a first area from the contour area detected by said first detecting code, wherein outer edges of the first area coincide with outer edges of the contour area detected by said first detecting code, and sandwiching the outer edges and inner edges positioned at inside of the outer edges by the width of a pixel at the first resolution;

a second image reading code for reading the image of the original with the image reading apparatus at a second resolution higher than the first resolution, over only a second area having outer edges thereof shared by the outer edges of the first area extracted by said first extracting code, to obtain second image data;

a second detecting code for detecting a contour of the image of the original from the area overlapping the first area with the second area obtained by said second image reading code;

a second extracting code for extracting third image data of an image portion inside the contour of the image of the original detected by said second detecting code, from the second image data obtained by said second image reading code; and a storing code for storing the extracted third image data in a storage device.

* * * * *